No. 877,046. PATENTED JAN. 21, 1908.
F. R. BROWN.
CHUCK.
APPLICATION FILED MAR. 28, 1907.
2 SHEETS—SHEET 1.
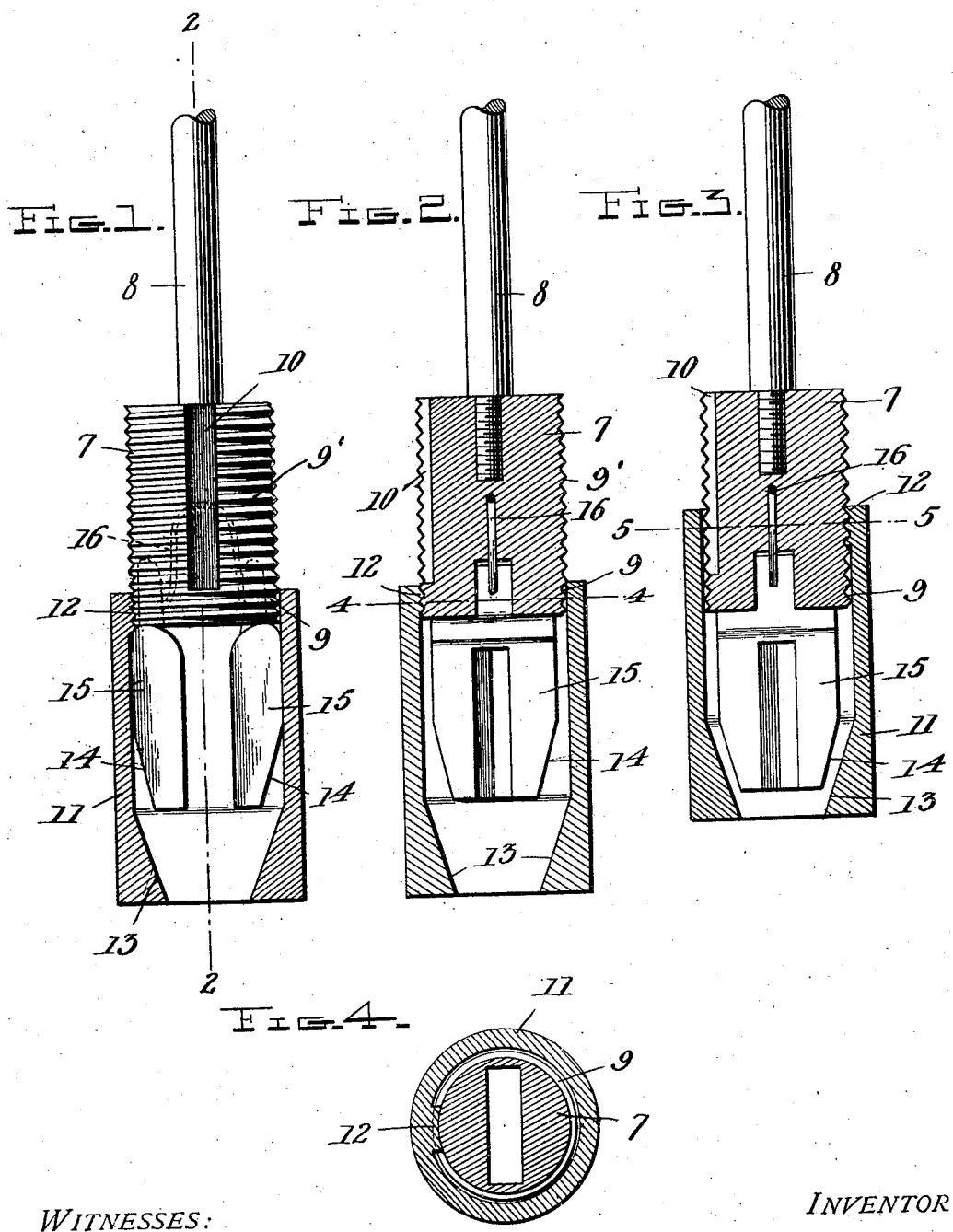
WITNESSES:
INVENTOR
Frank R. Brown.
BY
Attorneys No. 877,046. PATENTED JAN. 21, 1908.
F. R. BROWN.
CHUCK.
APPLICATION FILED MAR. 28, 1907.

2 SHEETS—SHEET 2.

WITNESSES:

INVENTOR
Frank R. Brown.
By
Attorneys

UNITED STATES PATENT OFFICE.

FRANK R. BROWN, OF RURAL RETREAT, VIRGINIA.

CHUCK.

No. 877,046.  Specification of Letters Patent.  Patented Jan. 21, 1908.

Application filed March 28, 1907. Serial No. 365,097.

*To all whom it may concern:*

Be it known that FRANK R. BROWN, a citizen of the United States, residing at Rural Retreat, in the county of Wythe and State of Virginia, has invented certain new and useful Improvements in Chucks, of which the following is a specification.

My invention relates to improvements in brace chucks; applicable for use on boring braces, drills, and like machinery, and has as an object to provide an improved means for holding the sleeve of the chuck at the desired adjustment for clamping the tools, to be used between the usual clamping jaws.

Figure 5:
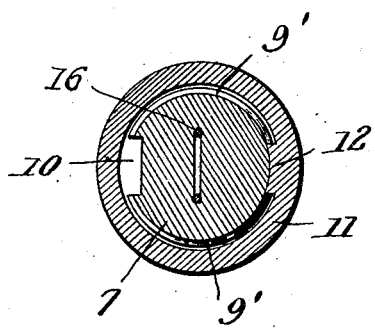
Figure 6:
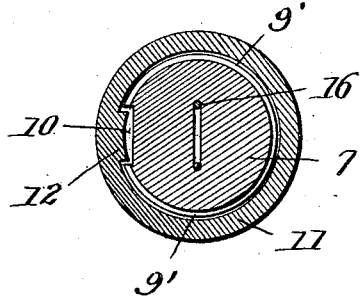
Figure 7:
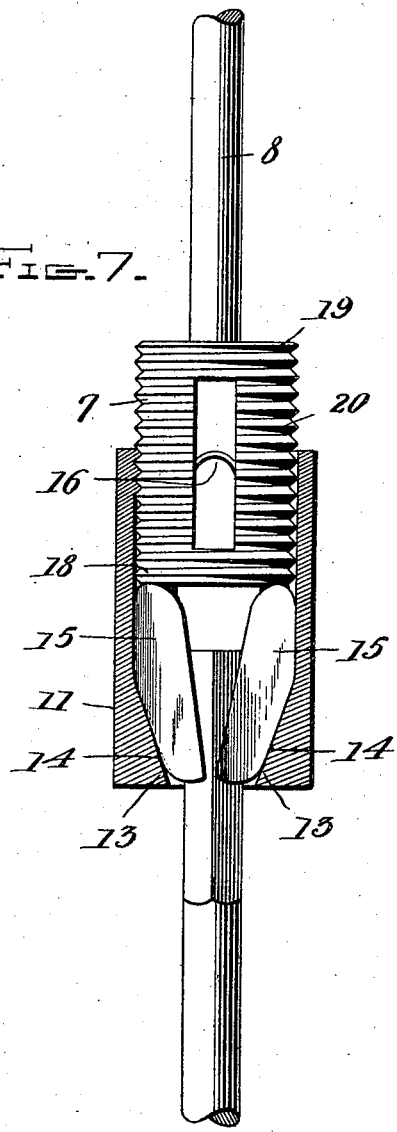

In the drawings Figure 1 is an elevational view partly in section. Fig. 2 is a section on the line 2—2 of Fig. 1. Fig. 3 is a similar view with the sleeve moved up the body of the chuck, and in a clamping position thereon. Fig. 4 is a cross on the line 4—4 of Fig. 2. Fig. 5 is a similar view on the line 5—5 of Fig. 3. Fig. 6 is a similar view with the sleeve turned to disengage the tool. Fig. 7 is a modified form.

Referring specifically to the drawings 7 denotes the body of the chuck, connected in the usual manner to the stem of the brace, which is indicated at 8, the body of the chuck is threaded exteriorly, continuously as at 9, and above this portion, the thread is cut away, by forming in the body of the chuck a slot 10, which extends to the top thereof, whereby an interrupted thread 9' is had.

At 11 is indicated a sleeve provided with a small interior threaded portion 12, adapted to ride in the slot 10 of the chuck 7, and to also engage at times with the lower threads 9 thereof. This sleeve is provided with the usual inclines 13 to engage similar inclines 14 on the usual clamping jaws 15, which are held open by springs 16.

The operation of the chuck may be described as follows: The sleeve 11 is first turned to disengage the threads 12, of the sleeve 11 from the threads 9 of the body of the chuck 7, and the threads 12 brought into alinement with the slot 10. A tool 17 is inserted between the jaws 15 and the sleeve pushed up the slot until the proper clamping action is had, and is then turned to engage the threads 9' of the chuck. The purpose of the lower uninterrupted portion of the threads 9 is now to be explained. When it is desired to disengage the tool 17, from the jaws 15, the threads 12 are brought into alinement with the slot 10 as hereinbefore mentioned, and the sleeve run down the body of the chuck until the said uninterrupted portion is met and the sleeve turned to engage the threads 12 therewith, whereby the sleeve is held to the body of the chuck from displacement when the brace is not in use.

In the modified form shown in Fig. 7, the body portion is provided with continuous threads 18—19 respectively both above and below an interrupted portion 20, whereby the tool is held from displacement from the chuck body. It will therefore be seen, that if the sleeve in its adjusted position is at the top or near the top of the body of the chuck, and it is desired to release the tool from the clamping jaws it will not be necessary to slide the sleeve all the way down the slot to lock the same on the chuck body, but it can be moved to engage the threaded portion above the slot 10.

What is claimed is:

1. In a tool holding chuck, the combination with a body portion having threads thereupon throughout a portion of its length, interrupted by a continuous longitudinal slot, said body portion having continuous threads beyond the interrupted threads disposed to close the end of said slot and a sleeve engaged with the body portion and having a threaded portion engaged in the slot for sliding movement longitudinally thereof, said sleeve being arranged for rotation on the body portion to engage the threads at the sides of the slot.

2. In a tool holding chuck, the combination with a body portion having threads thereupon throughout a portion of its length, interrupted by a continuous longitudinal slot, said body portion having continuous threads adjacent said slot, a sleeve engaged with the body portion and having a threaded portion engaged in said slot for sliding movement longitudinally thereof, said sleeve being arranged for rotation on the body portion to engage the threads at the sides of the slot or the threaded portion adjacent said slot.

In testimony whereof he affixes his signature, in presence of two witnesses.

FRANK R. BROWN.

Witnesses:
 C. W. DAVIS,
 ROBT. R. BUCKLEY.